3,489,757
1-ALKYLENEDIOXY ARALKYL-4-(THIAZOLYL-2)-PIPERAZINES
Volker Koppe, Karl Schulte, Siegmund Sommer, and Ernst Schorscher, Darmstadt, Germany, assignors to E. Merck A.G., Darmstadt, Germany
No Drawing. Filed Feb. 17, 1966, Ser. No. 528,058
Claims priority, application Germany, Feb. 20, 1965, M 64,244
Int. Cl. C07d 99/10; A61k 27/00
U.S. Cl. 260—268                         6 Claims

ABSTRACT OF THE DISCLOSURE

For effecting hypotensive activity in mammals, compounds of the formula

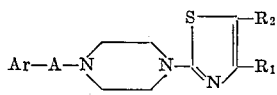

wherein:

Ar is 3,4-methylenedioxyphenyl or 3,4-ethylenedioxyphenyl,
A is alkylene of 1–6 carbon atoms,
$R_1$ and $R_2$ each is hydrogen; Cl; Br; I; alkyl of 1–6 carbon atoms; aralkyl of 7–10 carbon atoms; unsubstituted phenyl; phenyl substituted with not more than three members selected from the group consisting of F, Cl, Br, I, trifluoromethyl, methylenedioxy, ethylenedioxy, alkyl or alkoxy of 1–4 carbon atoms with the provision that phenyl is substituted by not more than one isoalkyl; or $R_1$ together with $R_2$ represents the radical —CH=CH—CH=CH—.

---

This invention relates to novel substituted piperazines, their uses, and processes of production.

An object of this invention, therefore, is to provide novel piperazine derivatives.

Another object is to provide processes for the production of these novel compounds, as well as novel intermediates therefor.

Still further objects include pharmaceutical preparations and methods of effecting therapeutic activity based on the novel compounds of this invention.

Upon further study of the specification and claims, other objects and advantages of the present invention will become apparent.

The novel 1-aralkyl-4-(thiazolyl-2)-piperazines of this invention correspond to the Formula I, as well as their acid addition salts, as follows:

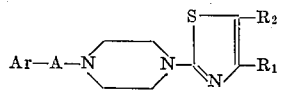

(I)

wherein:

$R_1$ and $R_2$, being identical or different, represent H, Cl, Br, I, alkyl having 1–6 carbon atoms, aralkyl having 7–10 carbon atoms, phenyl, and, if desired, mono- or polysubstituted with alkyl or alkoxy groups having 1–4 carbon atoms, F, Cl, Br, I, trifluoromethyl, methylenedioxy, or ethylenedioxy, and $R_1$ together with $R_2$ represents the group

—CH=CH—CH=CH—

A represents a straight-chain or branched alkylene group having 1–6 carbon atoms; and Ar represents 3,4-methylenedioxy-phenyl or 3,4-ethylenedioxy-phenyl.

The novel piperazine derivatives possess very valuable pharmacological properties. Of particular importance, they exert a hypotensive action when administered to mammals and are useful as antihypertensive drugs. Although it is difficult to differentiate the precise pharmacological sites of action of these compounds, it is believed that they act on the higher centers of the brain stem which regulate the circulation. The hypotensive effect appears to be due to an inhibition of the vasopressoric brain stem centers with simultaneous inhibition of the cardioaccelerators.

In addition to the hypotensive action these compounds also exert a moderating effect on the central nervous system by inhibition, presumably by slight inhibition on the cerebral cortex.

In comparison with the commercial product 2-(octahydroazocinyl-1)-ethyl guanidine sulfate, 1-(3,4-methylenedioxy - phenyl)-2-[N'-(4-methyl - thiazolyl-2)-piperazino]-propane administered intravenously to narcotized and to conscious dogs possessed a strong hypotensive effect equal to that attained by the administration of the commercial compound in dosages 20 times as great. The compound did not show any significant influence on other circulatory functions and at the same time was well tolerated. Beneficial effects were also noted with 1-(3,4-methylenedioxy-phenyl) - 2 - [N'-(4-methyl - thiazolyl-2)-piperazino]-ethane, 1-(3,4 - methylenedioxy - phenyl)-2-[N'-(4-methylthiazolyl - 2) - piperazino]-butane and 1-(3,4-methylenedioxy-phenyl) - 2 - [N'-methylthiazolyl - 2)-piperazino]-pentane.

To produce the novel piperazines of Formula I, as well as the physiological acid addition salts thereof, there are provided various processes, comprising the following steps:

(A) Condensing a compound of Formula II $$Ar—A—X \quad (II)$$

wherein X represents Cl, Br, I, OH, alkylsulfonyloxy having 1–6 carbon atoms, or arylsulfonyloxy having 6–10 carbon atoms, with a (thiazolyl-2)-piperazine of Formula III

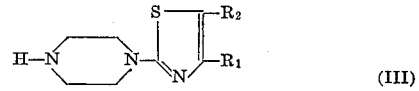

(III)

(B) Condensing an aralkyl-piperazine of Formula IV

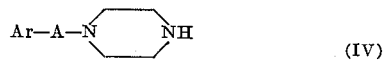

(IV)

with a thiazole derivative of Formula V

(V)

(C) Condensing an aralkylamine of Formula VI $$Ar—A—NH_2 \quad (VI)$$

with an aminothiazole derivative of Formula VII

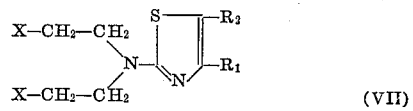

(VII)

wherein X has the above-stated meaning, or else, the two X-groups together denote an oxygen atom;

(D) Condensing a nitrile of Formula VIII

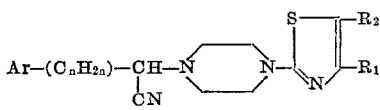  (VIII)

wherein $n$ is 0 to 4, with an organometallic compound of Formula IX $$R_3—M \qquad (IX)$$

wherein:

$R_3$ represents an alkyl having 1–5 carbon atoms,
M is MgY or an alkali metal, preferably lithium, and
Y represents Cl, Br, or I, and wherein the sum of $n$ in Formula VIII and the number of carbon atoms in $R_3$ must not be greater than 5;

(E) Condensing an organometallic compound of the Formula X $$Ar—(C_mH_{2m})—M \qquad (X)$$

wherein $m$ is 0 to 5, with a nitrile of Formula XI

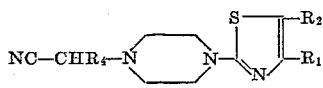  (XI)

wherein $R_4$ represents H or, when $m$ is smaller than 5, $CH_3$;

(F) Condensing a thiourea of Formula XII

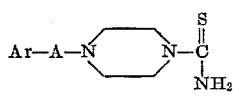  (XII)

with a carbonyl compound of Formula XIII

  (XIII)

(G) Treating a compound of Formula I which additionally contains one or more hydrogen-substitutable groups and/or C—C multiple bonds with a hydrogen-evolving reagent;

(H) And/or that optionally the compounds of Formula I are treated with an acid to convert them into a physiologically compatible acid addition salt thereof, or liberating a base of Formula I from its acid addition salt.

In Formulae II–XIII, $R_1$, $R_2$, A, Ar, and X have the above-stated meanings.

In case $R_1$ and $R_2$ represent alkyl groups, they can be selected from alkyl groups, such as methyl, ethyl, n-propyl, isopropyl, n-butyl, isobutyl, and also sec.-butyl and tert.- butyl. $R_1$ and $R_2$ can, for example, also be one of the following: n-amyl, isoamyl, 2-methylbutyl-(1), pentyl-(2), pentyl-(3), 3-methylbutyl-(2), neopentyl, tert.-amyl, n-hexyl, or isohexyl.

The following aralkyl groups can, for example, constitute the radicals $R_1$ and $R_2$: benzyl, o-, m-, and p-methylbenzyl, 1- and 2-phenylethyl, 3-phenylpropyl, 4-phenylbutyl.

$R_1$ and $R_2$ can also be selected from among the following: phenyl, o-, m-, or p-tolyl, 2,4-dimethylphenyl, o-, m-, or p-ethylphenyl, p-isopropylphenyl, 2-methyl-5-isopropylphenyl, o-, m-, or p-methoxyphenyl, 2,3-, 2,4-, 2,5-, 2,6- 3,4- of 3,5-dimethoxyphenyl, 3,4,5-trimethoxyphenyl, 2-methoxy-5-methylphenyl, o-, m-, or p-ethoxyphenyl, 2,3- or 3,4-methylenedioxyphenyl, 2,3- or 3,4-ethylenedioxyphenyl, o-, m-, or p-fluorophenyl, o-, m-, or p-chlorophenyl, o-, m-, or p-bromophenyl, o-, m-, or p-iodophenyl 2,3-, 2,4-, 2,5-, 2,6-, 3,4-, or 3,5-dichlorophenyl, 2,4,6-trichlorophenyl, 2,4-di-bromophenyl, o-, m-, or p-trifluoromethylphenyl.

$R_1$ and $R_2$ together can represent

—CH=CH—CH=CH— in which case they form a benzothiazole ring joined to the thiazole ring.

As straight or branched chain alkylene groups in A, the following are preferred:

—CH$_2$—, —CH$_2$CH$_2$—, —CHCH$_3$—, —CH$_2$CH$_2$CH$_2$—
—CH(CH$_3$)CH$_2$—, —CH$_2$CH(CH$_3$)—
—CHC$_2$H$_5$—, —CH$_2$CH$_2$CH$_2$CH$_2$—
—CH(CH$_3$)CH$_2$CH$_2$—, —CH$_2$CH(CH$_3$)CH$_2$—
—CH$_2$CH$_2$CH(CH$_3$)—, —(CH$_2$)$_5$—, —(CH$_2$)$_6$— they may also, for example, have the following meanings:
—CH(C$_2$H$_5$)CH$_2$—, —CH$_2$CH(C$_2$H$_5$)—
CH(n-C$_3$H$_7$)—, —CH(iso-C$_3$H$_7$)—
—CH(CH$_3$)CH$_2$CH$_2$CH$_2$—, —CH$_2$CH(CH$_3$)CH$_2$CH$_2$—
—CH(C$_2$H$_5$)CH$_2$CH$_2$—, CH$_2$CH(C$_2$H$_5$)CH$_2$—
—CH(C$_2$H$_5$)CH$_2$CH$_2$—, —CH$_2$CH(C$_2$H$_5$)CH$_2$—
—CH$_2$CH$_2$CH(C$_2$H$_5$)—, —CH(n-C$_3$H$_7$)CH$_2$—
—CH$_2$CH(n-C$_3$H$_7$)—, CH(iso-C$_3$H$_7$)CH$_2$—
—CH$_2$CH(iso-C$_3$H$_7$)—, CH(n-C$_4$H$_9$)—
—CH(iso-C$_4$H$_9$)—, —CH(sec.-C$_4$H$_9$)—
—CH(tert.-C$_4$H$_9$—, —CH(CH$_3$)CH$_2$CH$_2$CH$_2$—
—CH$_2$CH(CH$_3$)CH$_2$CH$_2$—
—CH$_2$CH$_2$CH(CH$_3$)CH$_2$CH$_2$—
—CH$_2$CH$_2$CH$_2$CH(CH$_3$)CH$_2$—
—CH$_2$CH$_2$CH$_2$CH$_2$CH(CH$_3$)—

In addition to representing Cl, Br, I, or OH, X, in Formula II, preferably represents methanesulfonyloxy or p-toluenesulfonyloxy. Under reducing conditions, e.g., under hydrogen in the presence of a hydrogenation catalyst, it is also possible to use starting compounds differing from those in Formulae II, VII, or XIII only in that instead of one or two CHX radicals they contain aldehyde, keto, ester, or other analogous functions which are reduced to CHOH under the reaction conditions.

It is to be understood that the expression "hydrogen substitutable groups" is to be construed broadly and refers to halogen atoms, preferably chlorine or bromine atoms, and also carbonyl oxygen or hydroxy groups.

The C—C multiple bonds are preferably double bonds, but triple bonds can also be converted by treatment with hydrogen-evolving agents into saturated bonds. Suitable hydrogen-evolving agents are exemplified by the following: hydrogen in the presence of a hydrogenation catalyst, sodium amalgam, sodium in alcohol or in liquid ammonia.

The starting compounds of Formula II are as follows: 3,4-methylenedioxyphenyl derivatives, such as, for example:

2-(3,4-methylenedioxyphenyl)-ethyl-bromide;
1-(3,4-methylenedioxyphenyl)-propyl-(2)-bromide;
1-(3,4-methylenedioxyphenyl)-butyl-(2)-bromide;
1-(3,4-methylenedioxyphenyl)-pentyl-(2)-bromide;
3-(3,4-methylenedioxyphenyl)-propyl-bromide;
2-(3,4-ethylenedioxyphenyl)-ethyl-bromide;
1-(3,4-ethylenedioxyphenyl)-propyl-(2)-bromide;
1-(3,4-ethylenedioxyphenyl)-propyl-(2)-bromide;
1-(3,4-ethylenedioxyphenyl)-butyl-(2)-bromide;
1-(3,4-ethylenedioxyphenyl)-pentyl-(2)-bromide;
3-(3,4-ethylenedioxyphenyl)-propyl-bromide.

the corresponding chlorides, iodides, or alcohols and their esters, and particularly their methanesulfonates and p-toluenesulfonates can be used in place of the bromides.

The following piperazines can be used as the compounds of Formula III:

N-thiazolyl-(2)-piperazine;
N-(4-methyl-thiazolyl-2)-piperazine;
N-(5-methyl-thiazolyl-2)-piperazine;
N-(5-chlorothiazolyl-2)-piperazine;
N-(4-methyl-5-chlorothiazolyl-2);
N-(benzothiazolyl-2)-piperazine.

The straight-chain piperazines of Formula I are preferably obtainable by the reaction of the compounds of Formula II with the (thiazolyl-2)-piperazines of Formula III. The compounds of Formula II are, for the most part, known or can be easily manufactured by analogy to known compounds. The primary alcohols of Formula II (X=OH), for example, are obtained by reducing the corresponding carboxylic acids or esters, and secondary or tertiary alcohols are obtained from the corresponding ketones by reduction or reaction thereof with organometallic compounds. Treatment with thionyl chloride, hydrogen bromide, phosphorus tribromide, or similar halogen compounds yields the corresponding halogenides (II, X=Cl or Br). The corresponding iodine compounds are obtained, for example, by treating the appropriate p-toluenesulfonates with potassium iodide. The sulfonyloxy compounds are obtainable from the alcohols Ar—A—OH by reaction thereof with the corresponding acid chlorides. The piperazines of Formula III are obtainable by reacting 2-aminothiazoles with diethanolamine, morpholine, or bis-(2-chloroethyl)-amine, or by reacting piperazine with thiazole derivatives of Formula V, preferably 2-chloro- or 2-bromothiazoles.

The reaction between compounds of Formulae II and III can be carried out by methods known from the literature for the alkylation of amines. The reaction can be conducted without a solvent, by melting the reactants together, if desired, in a closed tube or in an autoclave. The reaction can also be conducted in the presence of an inert solvent, such as water, benzene, toluene, xylene, acetone, butanone, or another ketone, methanol, ethanol, or another alcohol, tetrahydrofuran or dioxane, or mixtures thereof. It is advantageous to add an acid-binding agent, for example, a hydroxide, carbonate, bicarbonate, or another alkali metal or alkaline earth metal, more particularly sodium, potassium, or calcium salts of a weak acid; an organic base, such as triethylamine, dimethylaniline, pyridine, or quinoline, or an excess of the piperazine derivative of Formula III. Depending upon the conditions employed, the reaction time is between a few minutes and 14 days, the reaction temperature suitably being from 0° C. to 200° C., preferably 100–130° C. If no solvent is used and the reaction is conducted at about 120° C., the reaction is terminated after about one-half to 2 hours. Where solvents are used, heating for 12 to 24 hours is occasionally necessary to obtain satisfactory yields.

In an alternative embodiment of the above method, a Formula XIV aldehyde, $$Ar—C_m—H_{2m}—CHO \qquad (XIV)$$

wherein $m$ is 0 to 5, is reacted with a Formula III piperazine under catalytic hydrogenation conditions. The reaction is accomplished by using the reaction conditions disclosed in the literature in connection with reductive alkylation processes. The aldehydes XIV can be obtained by oxidation of the corresponding primary alcohols of Formula II (X=OH) or by hydrogenation of the corresponding acid chlorides in the presence of Pd/BaSO$_4$ catalysts.

The Formula I compounds can also be obtained by the reaction of an aralkylpiperazine of Formula IV with a thiazole derivative of Formula V.

The aralkylpiperazines of Formula IV can be obtained either by the reaction of aralkyl-halogenides of Formula II with 1-benzyl-piperazine and subsequent reductive removal of the benzyl group, or by the reaction of aralkyl amines of Formula VI with diethanolamine, morpholine, or bis-(2-chloroethyl)amine. Among the aralkylpiperazines of Formula IV which can be used are the following:

2-(3,4-methylenedioxyphenyl)-ethyl-piperazine;
1-(3,4-methylenedioxyphenyl)-propyl-(2)-piperazine;
1-(3,4-methylenedioxyphenyl)-butyl-(2)-piperazine;
2-(3,4-ethylenedioxyphenyl)-ethyl-piperazine;
1-(3,4-ethylenedioxyphenyl)-propyl-(2)-piperazine;
1-(3,4-ethylenedioxyphenyl)-butyl-(2)-piperazine, and
3-(3,4-methylenedioxyphenyl)-propyl-piperazine.

The thiazole derivatives of Formula V are either known or can easily be obtained by the methods described in the literature for the synthesis of 2-halogeno-thiazoles.

The reaction between compounds IV and V can be conducted by the above-stated methods of N-alkylation.

Further, compounds of Formula I can be obtained by synthesizing the piperazine ring from suitable precursors. Thus, aralkylamines of Formula VI, obtained by the reaction of compounds or Formula II with potassium phthalimide, or by reduction of the corresponding nitriles, can be reacted with nitrogen-mustard gas compounds of Formula VII. The latter compounds are produced, for example, by the reaction of 2-halogeno-thiazoles of Formula V with diethanolamine or of 2-aminothiazoles with ethylene oxide and subsequent transformation of the hydroxy groups into halogen atoms, with thionyl-chloride, for example. The following are suitable starting compounds for these reactions—

Formula VI:

2-(3,4-methylenedioxyphenyl)-ethylamine;
1-(3,4-methylenedioxyphenyl)-propyl-(2 or 3)-amine;
1-(3,4-methylenedioxyphenyl)-butyl-(2)-amine;
2-(3,4-ethylenedioxyphenyl)-ethylamine;
1-(3,4-ethylenedioxyphenyl)-propyl-(2)-amine;
1-(3,4-ethylenedioxyphenyl)-butyl-(2)-amine.

Formula VII:

2-[bis-(2-chloroethyl) - amino]- and 2-[bis - (2-bromoethyl)-amino]-thiazole and their 4- or 5-methyl, 5-chloro- and 4-methyl-5-chloro-derivatives;
2-[bis-(2-bromoethyl) - amino]- and 2-[bis - (2-chloroethyl)-amino]-benzothiazole;
N-(4-methyl-thiazolyl-2)-morpholine;
N-(4,5-dimethyl-thiazolyl-2)-morpholine.

The reaction of nitriles of Formula VIII with organometallic compounds of Formula IX (preferably Grignard compounds of the formula $R_3$—Mg—Y), or a reaction of organometallic compounds of Formula X (preferably Grignard compounds of the formula $$Ar—(C_mH_{2m})—Mg—Y)$$

with nitriles of Formula XI also yields the desired compounds of Formula I.

Nitriles of Formula VIII can be obtained from the corresponding aldehydes of the formula $$Ar—(C_nH_{2n})—CHO$$

by conversion thereof to the bisulfite compound and then by successive reactions with an N-thiazolyl-2-piperazine of Formula III and with an alkali cyanide, preferably potassium cyanide. The following are suitable specific novel starting compounds of Formula VIII:

(3,4-methylenedioxyphenyl) - cyano - [N' - (4 - methylthiazolyl-2-piperazino]-methane;
1-(3,4-methylenedioxy - phenyl) - 2 - cyano - 2 - [N'-(thiazolyl-2)-piperazino]-ethane;
1-(3,4-methylenedioxyphenyl) - 2 - cyano - 2 - [N' - (4-methyl-thiazolyl-2)-piperazine]-ethane;
1-(3,4 - methylenedioxyphenyl) - 3 - cyano - 3 - [N'-(thiazolyl-2)-piperazino]-propane;
1-(3,4-methylene-dioxyphenyl) - 3 - cyano - 3 - [N'-(4-methylthiazolyl-2)-piperazino]-propane;
1-(3,4 - ethylenedioxyphenyl) - 2 - cyano - 2 - [N'-(thiazolyl-2)-piperazino]-ethane;
1-(3,4-ethylenedioxyphenyl) - 2 - cyano - 2 - [N' - (4-methyl-thiazolyl-2)-piperazino]-ethane;
1 - (3,4 - ethylenedioxyphenyl) - 3 - cyano - 3 - [N' - (thiazolyl-2)-piperazino]-propane;
1-(3,4-ethylenedioxyphenyl) - 3 - cyano - 3 - [N' - (4-methylthiazolyl-2)-piperazino]-propane.

Suitable organometallic compounds of Formula IX are methylmagnesium iodide; ethylmagnesium chloride, bromide, and iodide; n-propylmagnesium chloride; bromide, and iodide; isopropylmagnesium chloride, bromide, and iodide; n-butyl-magnesium chloride, bromide, and iodide;

and also methyl-, ethyl-, n-propyl-, isopropyl-, and n-butyl-lithium.

Preferred starting compounds of Formula X are 3,4-methylenedioxybenzylmagnesium chloride, bromide, and iodide; 2-(3,4 - methylenedioxyphenyl) - ethylmagnesium chloride, bromide, and iodide; 3-(3,4 - methylenedioxyphenyl)-propylmagnesium chloride, bromide, and iodide; 3,4-ethylenedioxybenzyl - magnesium chloride, bromide, and iodide; 2-(3,4 - ethylenedioxyphenyl) - ethylmagnesium chloride, bromide, and iodide; 3-(3,4-ethylenedioxyphenyl)-propylmagnesium chloride, bromide, and iodide; as well as the corresponding organo-lithium compounds.

The nitriles of the Formula XI are readily produced from the (thiazolyl-2)-piperazines of the Formula III by reaction thereof with formaldehyde (or acetaldehyde, respectively) and potassium cyanide. Typical members of the class of compounds represented by Formula XI are:

N'-thiazolyl-(2)-piperazino-acetonitrile;
N'-4-methylthiazolyl-2-piperazino-acetonitrile;
N'-(5-methylthiazolyl-2)-piperazino-acetonitrile;
N'-(5-chlorothiazolyl-2)-piperazino-acetonitrile;
N'-(benzthiazolyl-2)-piperazino-acetonitrile;
α-(N'-thiazolyl-2-piperazino)-propionitrile;
α-[N'-(4-methylthiazolyl-2)-piperazino]-propionitrile.

The reaction of the nitriles of Formula VIII (or XI, respectively) with the organometallic compounds of Formula IX (or X, respectively) can usually be carried out by adding the nitrile slowly, either in solution or in its solid form, to a solution of the organometallic compound, if desired under cooling, and followed by heating the resulting mixture until the reaction is completed. Suitable solvents are: ether, diisopropylether, or tetrahydrofuran, also anisole, dibenzylether, dioxane, benzene, toluene, or methylene chloride, and also higher ethers or hydrocarbons, as well as mixtures of these solvents. In some cases, the addition of inorganic salts, such as magnesium bromide or copper (I) chloride is advisable.

The reaction time and the temperature at which the reaction is effected are immaterial; but it is preferred to carry out the reaction at a temperature of between 0° C. and the boiling point of the solvent being used; the reaction goes to completion after one-half to 48 hours, preferably after boiling for 4–6 hours. Hydrolysis of the mixture is then carried out in the conventional manner, e.g. with water, dilute acids, or ammonium chloride solution, and the resulting base or its salts are then isolated.

Formula I compounds can also be obtained by using a starting compound containing hydrogen atoms and/or one or more hydrogen-substitutable groups and/or C=C double bonds and/or C≡C triple bonds, and treating the same with a hydrogen-evolving agent. For example, hydrogen can replace chlorine or bromine atoms in the aromatic ring(s) or in the alkylene chain by catalytic hydrogenolysis or treatment with a chemical reducing agent. Thiazolyl-2-piperazino of Formula III can also be reacted with cinnamic acid chlorides to yield the corresponding amides whose carbonyl group can then be reduced with complex hydrides such as lithium-aluminum hydride, and whose double bond can be catalytically hydrogenated.

Reaction with lithium-aluminum hydride is effected advantageously in ether, tetrahydrofuran, or di-n-butyl-ether, preferably at the boiling temperature of these solvents. It is sometimes advantageous to continuously extract the slightly soluble starting materials with the boiling solvent. In principle, the methods described in the literature for this reaction are suitable.

Suitable catalysts for use in the catalytic hydrogenation and/or hydrogenolysis are, for example, the noble metal, nickel, and cobalt catalysts. The noble metal catalysts can be finely divided metal catalysts, or they can be deposited on a support, for example palladium on charcoal, calcium carbonate, or strontium carbonate, or the catalyst can be in the form of oxide catalysts, for example platinum oxide. Nickel and cobalt catalysts are advantageously used in the form of Raney metals, and nickel can also be used on kieselguhr or pumice stone supports. Hydrogenation can be carried out at room temperature and normal pressure or at elevated temperatures and/or elevated pressures. It is preferred to use pressures between 1 and 100 atmospheres and temperatures between −80 and +150° C., preferably between room temperature and +100° C. The reaction is advantageously carried out in the presence of a solvent, such as water, methanol, ethanol, isopropanol, n-butanol, ethyl acetate, dioxane, acetic acid, or tetrahydrofuran, or mixtures of these solvents. The free bases or the corresponding salts, for example, the hydrochlorides, can also be subjected to hydrogenation in the above-described manner. The hydrogenation conditions are, however, so selected that the other reducible fractions in the molecule, for example the phenyl and thiazole rings, are not also attacked. For the hydrogenation of multiple bonds, it is therefore preferred to use normal pressure, the hydrogenation being discontinued after absorption of a predetermined quantity of hydrogen.

The reaction of thioureas of Formula XII with carbonyl compounds of Formula XIII, preferably α-halogenoketones, is effected by methods described in the literature. The thioureas of Formula XII can be obtained, for example, by the reaction of the aralkyl-piperazines of Formula IV with nitrourea and subsequent reaction of the piperazine carboxamides thus obtained with phosphorus pentasulfide. The carbonyl compounds of Formula XIII are usually compounds known from the literature. The following are preferred starting materials for the synthesis of compounds of Formula XII:

1-[2-(3,4-methylenedioxyphenyl)-ethyl]-4-(thiocarboxamido)-piperazine;
1-[1-(3,4-methylenedioxyphenyl)-propyl-2]-4-(thiocarboxamido)-piperazine;
1-[3-(3,4-methylenedioxyphenyl)-propyl]-4-(thiocarboxamido)-piperazine;
1-[4-(3,4-methylenedioxyphenyl)-butyl]-4-(thiocarboxamido)-piperazine;
1-[2-(3,4-ethylenedioxyphenyl)-ethyl]-4-(thiocarboxamido)-piperazine.

Suitable starting materials for the synthesis of compounds of Formula XIII are, for example, chloroacetone, bromoacetone, 3-chloro- or 3-bromobutanone-(2)-chloro- or bromoacetaldehyde or compounds from which these aldehydes result during the course of the reaction, e.g. their acetals or 1,2-dihalogenodiethylether.

The products of Formula I obtained by the above methods can be isolated in the usual way, e.g., by extraction from the reaction mixtures and purification by distillation or crystallization of the bases or their salts, especially the hydrochlorides. Chromatographic methods can also be used in isolation and purification of these compounds.

A piperazine derivative of Formula I obtained by the process according to the invention can be converted into the corresponding acid addition salts with an acid. Acids which yield physiologically acceptable salts will be used for this reaction. Thus, it is possible to use organic and inorganic acids, for example aliphatic, alicyclic, araliphatic, aromatic, or heterocyclic monobasic or polybasic carboxylic or sulfonic acids, such as formic acid, acetic acid, propionic acid, pivalic acid, diethylacetic acid, oxalic acid, malonic acid, succinic acid, pimelic acid, fumaric acid, lactic acid, tartaric acid, malic acid, aminocarboxylic acids, sulfamic acid, benzoic acid, salicyclic acid, phenylpropionic acid, citric acid, gluconic acid, ascorbic acid, nicotinic acid, isonicotinic acid, methanesulfonic acid, ethanesulfonic acid, β-hydroxy-ethanesulfonic acid, p-toluenesulfonic acid, naphthalene-mono- and naphthalene-disulfonic acids, sulfuric acid, nitric acid, hydrohalic acids, such as hydrochloric acid or hydrobromic acid, or phosphoric acids, such as orthophosphoric acid. If required, the Formula I free bases can be obtained from their salts by treatment with strong bases, such as sodium or potassium hydroxide or sodium or potassium carbonate.

According to the invention, the following compounds are preferred, referring to Formula I:

Compounds wherein—

A is alkylene of 1–4 carbon atoms,
Ar, $R_1$, and $R_2$ have the previously indicated meanings, as well as the physiological acid addition salts of these compounds and the bases thereof;

Compounds wherein—

A is alkylene of 1–4 carbon atoms,
$R_1$ and $R_2$ each represent H, Cl, or $CH_3$,
Ar has the previously indicated meaning, as well as the physiological acid addition salts of these compounds and the bases thereof;

Compounds wherein—

$R_1$ is $CH_3$,
$R_2$ is H,
Ar and A have the previously indicated meanings, as well as the physiological acid addition salts of these compounds and the bases thereof.

Particularly valuable are compounds of the following groups, referring again to Formula I:

Compounds wherein—

$R_1$ and $R_2$ are each H,
Ar and A have the previously indicated meanings, as well as the physiological acid addition salts of these compounds and the bases thereof;

Compounds wherein—

Ar is 3,4-methylenedioxyphenyl,
A is alkylene of 1–4 carbon atoms,
$R_1$ and $R_2$ each represent H, Cl, or $CH_3$, as well as the physiological acid addition salts of these compounds and the bases thereof; and Compounds wherein—

Ar is 3,4-methylenedioxyphenyl,
A is alkylene of 1–4 carbon atoms,
$R_1$ is $CH_3$,
$R_2$ is H, as well as the physiological acid addition salts of these compounds and the bases thereof.

The following are new and vaulable intermediates of this invention:

1-(3,4-methylenedioxyphenyl)-4-chlorobutane;
1-(3,4-methylenedioxyphenyl)-4-bromobutane;
1-(3,4-methylenedioxyphenyl)-4-hydroxybutane and its esters, particularly its methanesulfonate and its p-toluenesulfonate; and the novel compounds of Formula VIII mentioned above.

The compounds of this invention can be employed in mixture with conventional pharmaceutical excipients used in the human or veterinary medicine. Carrier substances can be such organic or inorganic substances suitable for parenteral or enteral application, and which of course do not deleteriously react with the novel compounds, such as, for example, water, vegetable oils, polyethylene glycols, gelatin, lactic sugar, amylose, magnesium stearate, talc, Vaseline, cholesterol, etc.

For parenteral application, there are particularly suitable solutions, preferably oily or aqueous solutions, as well as suspensions, emulsions, or implants. For enteral application there can furthermore be employed tablets, dragees, and the like. For topical application, salves, liniments, creams, and the like which are, if desired, sterilized or mixed with auxiliary agents, such as preservatives, stabilizers, or wetting agents, or salts for influencing the osmotic pressure, or with buffer substances, can be employed.

The substances of the invention are preferably administered to mammals in a dosage of 0.1 to 50 mg., preferably 0.2 to 2 mg., per unit dosage. Ampoules are considered to be a dosage unit for parenteral application. With respect to enteral application, tablets are considered unit dosages, said tablets usually being formulated with at least one carbohydrate. If a liquid is used for enteral application, a sweetened vehicle is customarily employed. Generally, in a pharmaceutical composition containing 0.1 to 50 mg. of the active ingredient of this invention, the amount of carrier employed is in the range of 0.05 to 10 g., preferably 0.1 to 5 g.

Although the above unit dosages of the compounds of this invention, when administered to mammals, effect the desired pharmacological activity, it is preferred to employ 0.001 to 1 mg. of the compound per kg. of the host.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

EXAMPLE 1

A Grignard reagent is prepared from 3.5 g. magnesium and 21 g. methyl iodide in 80 ml. absolute ether. A solution (S) of 10 g. 1-(3,4-methylenedioxy-phenyl)-2-[N'-(4-methyl-thiazolyl-2)-piperazino] - 2 - cyano-ethane (with an M.P. of 114–115° C.) in 120 ml. absolute tetrahydrofuran is added to the agent with stirring and the mixture is subsequently refluxed for 5 hours. Upon cooling, the resulting composition is decomposed with dilute hydrochloric acid and worked up by adding sodium hydroxide solution, extraction with benzene, washing with water and removal of the solvent. The raw base (9.9 g.) obtained is purified as the hydrochloride. The obtained 1-(3,4-methylenedioxy-phenyl)-2-[N'-(4 - methylthiazolyl-2)-piperazino]-propanedihydrochloride melts at 238–240° C.

In an analogous manner with the solution S above, the following can be obtained:

With ethylmagnesium bromide:

1-(3,4-methylenedioxy-phenyl)-2-[N'-(4-methylthiazolyl - 2) - piperazino] - butane-dihydrochloride, M.P. 236—238° C.;

With n-propylmagnesium bromide:

1-(3,4-methylenedioxy-phenyl)-2-[N'-(4-methylthiazolyl - 2) - piperazino]-pentane-dihydrochloride, M.P. 204–206° C.

Similarly, there is obtained:

From 3,4-methylenedioxy-phenyl-[N'-(4-methylthiazolyl-2)-piperazino]-acetonitrile (M.P. 133–135° C.):

1-(3,4-methylenedioxy-phenyl) - 1 - [N'-(4-methyl-thiazolyl-2)-piperazino]-ethane, $B.P._{0.1 \text{ mm.}}$ 236–239°; dihydrochloride, M.P. 256–258° C. (decomposition):

From 1-(3,4-ethylenedioxy-phenyl)-2-[N'-(4-methylthiazolyl-2)-piperazino] - 2 - cyanoethane (M.P. 141–143° C.):

1-(3,4-ethylenedioxyphenyl)-2-[N'-(4-methyl-thiazolyl-2)-piperazino]-propane, dihydrochloride, M.P. 246–250° C. (decomposition); 1-(3,4-ethylenedioxyphenyl)-2-[N'-(4-methylthiazolyl - 2) - piperazino]-butane, dihydrochloride, M.P. 220–224° C. (decomposition);

From 1-(3,4-methylenedioxyphenyl)-3-[N'-(4-methylthiazolyl-2)-piperazino]-3-cyano-propane (obtained from 3-(3,4 - methylenedioxyphenyl)-propionaldehyde-bisulfite-compound, N - (4 - methyl-thiazolyl-2)-piperazine and potassium cyanide as oil):

1-(3,4-methylenedioxyphenyl)-3-[N'-(4-methyl-thiazolyl-2)-piperazino]-butane, B.P.$_{0.05\ mm.}$ 215–218° C.; dihydrochloride, M.P. 222–224° C.;

From 1-(3,4-methylenedioxyphenyl)-4-[N'-(4-methylthiazolyl-2)-piperazino] - 4 - cyano-butane (M.P. 85–87° C.):

1-(3,4-methylenedioxyphenyl)-4-[N'-(4-methyl-thiazolyl-2)-piperazino]-pentane, B.P.$_{0.05\ mm.}$ 225–230° C.; disulfate, M.P. 169–172° C. (decomposition);

From 1-(3,4-methylenedioxyphenyl)-2-[N'-(4-methylthiazolyl-2)-piperazino]-2-cyano-propane (M.P. 138–140° C.):

1-(3,4-methylenedioxyphenyl)-2-methyl-2-[N'-(4-methyl-thiazolyl-2)-piperazino]-propane, M.P. 95–96° C.; disulfate, M.P. 208–209° C. (decomposition);

1-(3,4-methylenedioxyphenyl)-2-methyl-2-[N'-(4-methyl-thiazolyl-2)-piperazino]-butane, B.P.$_{0.3\ mm.}$ 223–228° C.; disulfate, M.P. 216–218° C. (decomposition).

EXAMPLE 2

9.2 g. 3,4-methylenedioxy-phenethylchloride and 18.3 g. N-(4-methyl-thiazolyl-2-)-piperazine are maintained at a temperature of 120–130° C. for 2 hours. Upon cooling, the mixture is triturated with dilute aqueous ammonia, extracted with benzene and the benzene residue evaporated under high vacuo from the unreacted piperazine. The residue is then recrystallized from ether. 11 g. 1-(3,4-methylenedioxyphenyl)-2-[N'-(4-methyl-thiazolyl - 2) - piperazino]-ethane melting at 83° C. is obtained. The corresponding dihydrochloride melts at 258–260° C.

By using the above procedure, and an N-(4-methyl-thiazolyl-2)-piperazine, the following can be obtained:

From 3,4-methylenedioxy-benzylchloride:

(3,4-methylenedioxyphenyl)-[N'-(4-methyl - thiazolyl-2)-piperazino]-methane-dihydrochloride, M.P. 257–259° C.;

From 1-(3,4-methylenedioxyphenyl) - 3 - chloropropane (B.P.$_{12\ mm.}$ 154–156° C.):

1(3,4-methylenedioxyphenyl) - 3 - [N' - (4 - methyl-thiazolyl-)-piperazino]-propane, B.P.$_{0.1\ mm.}$ 220–223° C.; dihydrochloride, M.P. 221–223° C.;

From 1-(3,4-methylenedioxyphenyl)-2 - bromopropane:

1-(3,4-methylenedioxyphenyl) - 2 - [N' - (4 - methyl-thiazolyl-2)-piperazino] - propane, dihydrochloride, M.P. 238–240° C.;

From 3,4-ethylenedioxy-phenethylchloride:

1-(3,4-ethylenedioxyphenyl)-2-[N'-(4 - methylthiazolyl-2)-piperazino]-ethane, B.P.$_{0.05}$ 229–233° C.; dihydrochloride, M.P. 282–284° C. (decomposition);

From 1-(3,4-ethylenedioxyphenyl)-3-chloropropane:

1-(3,4-ethylenedioxyphenyl)-3-[N'-(4-methyl-thiazolyl-2-piperazino]-propane, B.P.$_{0.05\ mm.}$ 230–235° C., dihydrochloride, M.P. 223–225° C.;

From 1(3,4-methylenedioxyphenyl) - 4 - chlorobutane (B.P.$_{0.1\ mm.}$ 112–114° C.);

1(3,4-methylenedioxyphenyl)-4-[N'-(methyl-thiazolyl]-2-piperazino]-butane, B.P.$_{0.1\ mm.}$ 212–216° C.; dihydrochloride, M.P. 230–232° C.;

From 1-(3,4-methylenedioxyphenyl) - 5 - chloropentane (B.P.$_{12\ mm.}$ 180–185° C.);

1-(3,4-methylenedioxyphenyl)-5 - [N' - (4 - methyl-thiazolyl-2)-piperazino]-pentane, B.P. $_{0.05\ mm.}$ 220–224° C.; dihydrochloridehydrate, double M.P. 130° C. (loss of water of crystallization) and 194–197° C.;

From 1 - (3,4 - methylenedioxphenyl) - 6 - chlorohexane (B.P.$_{0.2\ mm.}$ 145–150° C.):

1-(3,4-methylenedioxyphenyl)-6 - [N' - (4 - methyl-thiazolyl-2)-piperazino] - hexane, B.P.$_{0.01\ mm.}$ 223–226° C.; hydrochloridehydrate, M.P. 194–197° C.; disulfate, M.P. 167–170° C.

EXAMPLE 3

35.6 g. 3,4-methylenedioxyphenyl acetone and 73.2 g. N-(4-methyl-thiazolyl-2)-piperazine are dissolved in 250 ml. methanol and the resulting solution is hydrogenated at 100 atmospheres pressure and a temperature of 106° C. in the presence of 50 g. Raney-nickel. After filtering off the catalyst and evaporation of the solvent, the residue is dissolved in ether and extracted with hydrochloric acid. Bases are precipitated from the acid extract by the addition of caustic soda solution thereto. The bases are then dissolved in ether and distilled after evaporation of the solvent. After the initial cut of N-(4-methyl-thiazolyl-2)-piperazine is removed, there is obtained 1-(3,4-methylenedioxyphenyl)-2-[N'-(4-methyl-thiazolyl-2)-piperazino]-propane with a B.P.$_{0.05\ mm.}$ 220–225° C.; dihydrochloride, M.P. 238–240° C.

EXAMPLE 4

3.1 g. 1-(3,4-methylenedioxyphenyl)-2-piperazino-propane B.P.$_{0.01\ mm.}$ 142–146° C. (obtained by the hydrogenolysis of 1-(3,4-methylenedioxyphenyl)-2-(N'-benzylpiperazino)-propanedihydrochloride with 5% palladium charcoal in ethanol) yields 1-(3,4-methylene-dioxyphenyl)-2-[N'-(4-methyl-thiazolyl-2)-piperazino] - propane when heated with 1.7 g. 2-chloro-4-methylthiazole and 12.5 g. picoline to a temperature of 125° C. Dihydrochloride, M.P. 238–240° C.

EXAMPLE 5

5.8 g. 4-(3,4-methylenedioxyphenyl)-butylamine (obtained by the reaction of 1-(3,4-methylenedioxyphenyl)-4-chlorobutane with potassium phthalimide and subsequent hydrolysis) and 5.1 g. 2-[bis-2-p-toluolsulfonyloxyethyl)-amino]-4-methyl-thiazole (obtained by the reaction of 2-chloro-4-methyl-thiazole with diethanolamine and subsequent reaction with p-toluolsulfonylchloride in pyridine) are boiled in a mixture of 150 ml. acetone and 150 ml. water for 24 hours. The acetone is then evaporated under vacuum, the aqueous mixture made alkaline with caustic soda and extracted with benzene. 1-(3,4-methylenedioxyphenyl)-4-[N'-(4-methyl-thiazolyl-2)-piperazino] - butane (B.P.$_{0.1\ mm.}$ 212–216° C.; dihydrochloride, M.P. 230–232° C.) is obtained from the benzene extract after repeated fractionation.

EXAMPLE 6

3.4 g. dry N-(3,4-methylenedioxy-hydrocinnamoyl)-N'-(4-methyl-thiazolyl-2)-piperazine (obtained by reaction of 3,4-methylenedioxy-hydrocinnamoylchloride with N - (4-methyl-thiazolyl-2)-piperazine in absolute ether in the presence of triethylamine) are dissolved in 50 ml. absolute tetrahydrofuran. The resulting solution is added dropwise to a suspension of 0.5 g. lithium aluminum hydride in 25 ml. absolute ether with stirring and bubbling dry nitrogen therethrough. The reaction mixture is boiled for 20 hours and worked up as in Example 1.

1-(3,4-methylenedioxyphenyl)-3 - [N' - (4 - methyl-thiazolyl-2)-piperazine]-propane (B.P.$_{0.1\ mm.}$ 220–223° C. dihydrochloride, M.P. 221–223° C.) is obtained after fractional distillation.

EXAMPLE 7

0.3 g. 1-(3,4-methylenedioxyphenyl)-2 - (N' - carboxamido-piperazino)-propane (obtained by reaction of 1-(3, 4-methylenedioxyphenyl)-2 - piperazino - propane with nitrourea in ethanol with warming) and 50 mg. diphosphorus pentasulfide are suspended in 1 ml. absolute benzene, 0.1 g. chloroacetone in 0.3 ml. absolute benzene is then added dropwise, with stirring, the mixture being boiled for one hour. Thereupon the mixture is cooled and dilute hydrochloric acid is added thereto. The phases are separated, the aqueous layer is alkalized with caustic soda solution and extracted with ether. By microdistillation of the ether residue, there is obtained 1-(3,4-methylenedioxyphenyl)-2-[N'-(4-methyl-thiazolyl-2) - piperazino] - propane which is then converted with ethereal hydrochloric acid to the dihydrochloride (M.P. 238–240° C.).

EXAMPLE 8

A mixture of 6 g. magnesium chips and 6 g. magnesium powder are vigorously mixed with 100 ml. boiling tetrahydrofuran. To the resulting solution 17 g. 3,4-methylenedioxybenzylchloride in 100 ml. tetrahydrofuran is added dropwise. The mixture is cooled and decanted while under a nitrogen atmosphere. To the solution of the resulting Grignard compound, a solution of 8 g. α-[N'-(4 - methyl-thiazolyl-2)-piperazino]-propionitrile (M.P. 77° C.; prepared by reaction of N'-(4-methylthiazolyl-2)-piperazine with acetaldehyde and potassium cyanide) in 50 ml. tetrahydrofuran is added and subsequently heated for 5 hours. After purification in the usual manner, 12 g. 1-(3,4-methylenedioxyphenyl)-2-[N'-(4-methyl-thiazolyl-2)-piperazino]-propane with a B.P.$_{0.05\ mm}$ 220–225° C. is obtained.

EXAMPLE 9

In accordance with the procedure of Example 1, the following 1-(3,4-methylenedioxyphenyl)- and 1-(3,4-ethylenedioxyphenyl)-alkanes are obtained by the reaction of the corresponding 1-(3,4-methylenedioxyphenyl)- or 1 - (3,4 - ethylenedioxyphenyl) - ω - (N'-thiazolyl-2-piperazino)-ω-cyanoalkane with alkylmagnesium chlorides (or -bromides or iodides):

1-(3,4-methylenedioxyphenyl)-alkanes—

-2-[N'-(thiazolyl-2)-piperazino]-propane
-2-[N'-(4-phenyl-thiazolyl-2)-piperazino]-propane
-2-[N'-(4-methyl-5-chloro-thiazolyl-2)-piperazino]-propane
-2-[N'-(thiazolyl-2)-piperazino]-butane
-2-[N'-(thiazolyl-2)-piperazino]-pentane
-3-[N'-(thiazolyl-2)-piperazino]-butane
-3-[N'-(4-methyl-thiazolyl-2)-piperazino]-pentane and
2-(3,4-methylenedioxyphenyl)-3-[N'-(4-methyl-thiazolyl-2)-piperazino]-butane, as well as the following 1-(3,4-ethylenedioxyphenyl)-alkanes—

-1-[N'-(4-methyl-thiazolyl-2)-piperazino]-ethane
-2-[N'-(thiazolyl-2)-piperazino]-propane
-2-[N'-(thiazolyl-2)-piperazino]-butane
-2-[N'-(4-phenyl-thiazolyl-2)-piperazino]-propane
-2-[N'-(4-phenyl-thiazoyl-2)-piperazino]-butane
-2-[N'-(thiazolyl-2)-piperazino]-pentane
-2-[N'-(4-methyl-thiazolyl-2)-piperazino]-pentane and
2-(3,4-ethylenedioxyphenyl)-3-[N'-(4-methylthiazolyl-2)-piperazino]-butane.

EXAMPLE 10

In accordance with the procedure of Example 2, the following 1-(3,4-(m)ethylenedioxyphenyl)-alkanes are obtained by reaction of the corresponding (3,4-methylenedioxyphenyl) or (3,4 - ethylenedioxyphenyl) - alkylbromides with the corresponding N'-(thiazolyl-2)-piperazines:

1-(3,4-methylenedioxyphenyl)-alkanes—

-2-[N'-(thiazolyl-2)-piperazino]-ethane
-2-[N'-(5-methyl-thiazolyl-2)-piperazino]-ethane
-2-[N'-(4,5-dimethyl-thiazolyl-2)-piperazino]-ethane
-2-[N'-(4-phenyl-thiazolyl-2)-piperazino]-ethane
-2-[N'-(4-methyl-5-chlor-thiazolyl-2)-piperazino]-ethane
-2-[N'-(benzothiazolyl-2)-piperazino]-ethane
-3-[N'-(thiazoyl-2)-piperazino]-propane
-4-[N'-(thiazolyl-2)-piperazino]-butane
-5-[N'-(thiazolyl-2)-piperazino]-pentane
-6-[N'-(thiazolyl-2)-piperazino]-hexane and
2-(3,4-methylenedioxyphenyl)-3-[N'-(4-methyl-thiazolyl-2)-piperazino]-propane
1-(3,4-methylenedioxyphenyl)-2-methyl-3-[N'-(4-methyl-thiazolyl-2)-piperazino]-propane
2-(3,4-methylenedioxyphenyl)-3-methyl-4-[N'-(4-methyl-thiazolyl-2)-piperazino]-butane
(3,4-ethylenedioxyphenyl)-[N'-(4-methyl-thiazolyl-2)-piperazino]-methane as well as the following 1-(3,4-ethylenedioxyphenyl)-alkanes—

-2-[N'-(thiazolyl-2)-piperazino]-ethane
-2-[N'-(4-phenyl-thiazolyl-2)-piperazino]-ethane
-2-[N'-(4,5-dimethyl-thiazolyl-2)-piperazinol]-ethane
-2-[N'-(4-methyl-5-chloro-thiazolyl-2)-piperazino]-ethane
-2-[N'-(benzothiazolyl-2)-piperazino]-ethane
-2-[N'-(5-methyl-thiazolyl-2)-piperazino]-ethane
-3-[N'-(thiazolyl-2)-piperazino]-propane
-4-[N'-(thiazolyl-2)-piperazino]-butane
-4-[N'-(4-methyl-thiazolyl-2)-piperazino]-butane
-5-[N'-(thiazolyl-2)-piperazino]-hexane
-6-[N'-(thiazolyl-2)-piperazino]-hexane
-6-[N'-(4-methyl-thiazolyl-2)-piperazino]-hexane
-2-methyl-2-[N'-(4-methyl-thiazolyl-2)-piperazino]-propane and
2-(3,4-ethylenedioxyphenyl)-3-[N'-(4-methyl-thiazolyl-2)-piperazino]-butane.

EXAMPLE 11

In accordance with the procedure of Example 2, the N-[4-(3,4 - methylenedioxyphenyl) - butyl]-piperazines containing the following substituents in the N'-position are obtained from 1-(3,4-methylenedioxyphenyl)-4-chlorobutane and the corresponding N-(thiazolyl-2)-piperazines:

4-ethyl-thiazolyl-2
4-n-propyl-thiazolyl-2
4-n-hexyl-thiazolyl-2
4-benzyl-thiazolyl-2
4-(4-phenylbutyl)-thiazolyl-2
4-chloro-thiazolyl-2
4-bromo-thiazolyl-2
4-iodo-thiazolyl-2
4-(p-tolyl)-thiazolyl-2
4-(p-isopropylphenyl)-thiazolyl-2
4-(p-ethoxyphenyl)-thiazolyl-2
4-(3,4-dimethoxyphenyl)-thiazolyl-2
4-(p-fluorophenyl)-thiazolyl-2
4-(o-chlorophenyl)-thiazolyl-2
4-(m-bromophenyl)-thiazolyl-2
4-(p-trifluoromethylphenyl)-thiazolyl-2
4-(3,4-methylenedioxyphenyl)-thiazolyl-2
4-(3,4-ethylenedioxyphenyl)-thiazolyl-2
4-methyl-5-phenyl-thiazolyl-2.

The following examples cover suitable pharmaceutical compositions which can be prepared according to conventional procedures.

EXAMPLE A.—TABLETS

| | Mg. |
|---|---|
| 1 - (3,4 - methylenedioxyphenyl)-4-[N'-(4-methyl-thiazolyl-2)-piperazino]-butane-dihydrochloride | 0.7 |
| Sodium chloride | 50 |
| Bole | 30 |
| Talc | 1ᴇ |
| Gelatin | 4.3 |
| Highly dispersed silicic acid | 5 |

EXAMPLE B.—COATED TABLETS

| | Mg. |
|---|---|
| 1 - (3,4 - methylenedioxyphenyl)-4-[N'-(4-methyl-thiazolyl-2)-piperazino]-butane-dihydrochloride | 0.5 |
| Lactose | 94.5 |
| Talc | 5 |

The coating consists of a mixture of cane sugar, talc, corn starch, and tragacanth. Its weight is about 100 mg.

EXAMPLE C.—SOLUTION FOR INJECTION

A solution of 350 g. of 1-(3,4-methylenedioxyphenyl)-4-[N'-(4-methyl-thiazolyl-2)piperazino]-butane-dihydrochloride in 1000 l. of distilled water is prepared and filled into ampoules in such a manner that each ampoule contains 0.35 mg. of the dihydrochloride.

In place of the listed dihydrochloride, it is also possible to incorporate other physiologically compatible acid addition salts of the base as well as other compounds embraced by Formula I or their physiologically compatible acid addition salts into similar preparations.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of a compound of the following formula, and a physiologically compatible acid addition salt thereof:

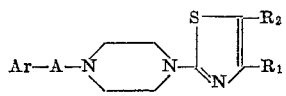

wherein
R₁ is H or CH₃;
R₂ is H;
Ar is 3,4-methylenedioxyphenyl; and
A is alkylene of 3–6 carbon atoms.

2. A compound as defined by claim 1 wherein R₁ is CH₃.

3. A member as defined by claim 1 wherein said member is 1-(3,4-methylenedioxyphenyl)-4-[N'-(4-methyl-thiazolyl-2)-piperazino]-butane.

4. A member as defined by claim 1 wherein said member is 1-(3,4-methylenedioxyphenyl)-2-[N'-(4-methyl-thiazolyl-2)-piperazino]-propane.

5. A member as defined by claim 1 wherein R₁ is H.

6. A member as defined by claim 1 wherein A is

—CH₂—CH₂—CH₂—CH₂— or

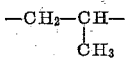

References Cited

UNITED STATES PATENTS 3,367,936  2/1968  Koppe et al. _____ 260—268
2,543,972  3/1951  Hultquist et al. _____ 260—268

DONALD G. DAUS, Primary Examiner

260—239, 302, 306.8, 309, 690, 340.2, 345.2, 217, 593, 554; 424—250